United States Patent
Ohtani et al.

(10) Patent No.: US 7,147,956 B2
(45) Date of Patent: Dec. 12, 2006

(54) FUEL CELL AND SEPARATOR THEREFOR

(75) Inventors: Teruyuki Ohtani, Wako (JP); Makoto Tsuji, Wako (JP); Masao Utsunomiya, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 596 days.

(21) Appl. No.: 09/968,850

(22) Filed: Oct. 3, 2001

(65) Prior Publication Data

US 2002/0061428 A1   May 23, 2002

(30) Foreign Application Priority Data

Oct. 4, 2000   (JP)  .............................. 2000-305239

(51) Int. Cl.
*H01M 8/02* (2006.01)
(52) U.S. Cl. .......................................... 429/39; 429/34
(58) Field of Classification Search ................ 429/30, 429/34, 39
See application file for complete search history.

(56) References Cited

U.S. PATENT DOCUMENTS 6,261,710 B1 *   7/2001   Marianowski ............... 429/34

FOREIGN PATENT DOCUMENTS

JP   2000-138065   5/2000
JP   2000-223137   8/2000

OTHER PUBLICATIONS

Abstract, JP 2000-138065, May 16, 2000, Makino Hiroshi.
Abstract, JP 2000-223137, Aug. 11, 2000, Matsukawa Masanori et al.

* cited by examiner

*Primary Examiner*—Jonathan Crepeau
(74) *Attorney, Agent, or Firm*—Sughrue Mion, PLLC

(57) ABSTRACT

A fuel cell comprises an membrane electrode assembly formed by holding an electrolyte membrane between a pair of electrodes and a separator layered on both sides of the membrane electrode assembly for forming gas passages between the separator and the electrode. The separator includes protrusions formed on both surfaces thereof for contacting with the electrode, and a spacer portion disposed between the protrusions for substantially forming the gas passage. The protrusions and the spacer portions are arranged along a surface direction of the separator so as to form a corrugated plate. At least two drawn portions in which thickness of the spacer portion changes to a thin portion are formed between the protrusions in the spacer portion.

6 Claims, 3 Drawing Sheets

FUEL CELL AND SEPARATOR THEREFOR

BACKGROUND OF THE INVENTION

1. Technical Field

The present invention relates to polymer electrolyte fuel cells, and relates to separators for forming gas passages in fuel cells.

2. Background Art

In polymer electrolyte fuel cells, a separator is layered on both sides of a plate-shaped membrane electrode assembly to form a unit of a layered structure, and plural units are layered to form a fuel cell stack. The membrane electrode assembly is a three-layered structure, in which a polymerized electrolyte membrane made from a resin such as ion-exchange resin is held by a pair of gas diffusion electrode plates (positive electrode plate and negative electrode plate). The separator is formed with gas passages for flowing a gas between the gas diffusion electrode plate and the separator. According to the fuel cell, hydrogen gas as a fuel is provided to the gas passages facing the gas diffusion electrode plate at the negative electrode side, and an oxidizing gas such as oxygen or air is provided to the gas passages facing the gas diffusion electrode plate at the positive electrode side, whereby electricity is generated by electrochemical reaction.

The separator provides electrons generated by catalytic reaction of the gas at the negative electrode side (hydrogen gas) to an external circuit, and transfers electrons provided from the external circuit to the positive electrode side. Therefore, separators are made from conductive materials of the carbon type and the metal type. In particular, it has been mentioned that material of the metal type is advantageous since it has good mechanical strength. Separators of the metal type are generally made by press forming a thin plate of aluminum alloy, carbon steel, or stainless steel to a corrugated sheet, of which the design has been disclosed in Japanese First Publications Nos. 2000-223137 and 2000-138065.

Fuel cells are assembled into a fuel cell stack by layered membrane electrode assemblys and separators as mentioned above. In the layering condition, plural protrusions projecting toward one surface side and another surface side of the separator are press contacted with an electrode of the membrane electrode assembly. The surface pressures of the protrusions press contacted with the electrode are required to be uniform as possible to reduce the internal resistance of the cell as effectively as possible so as to improve the power generation characteristics. However, since the metallic separator is a press formed product in a thin plate, it has been difficult to sufficiently satisfy such a requirement. Therefore, the surface pressure with respect to the electrode may be large in some protrusions, but may be small in other protrusions, and additionally, the surface pressure may vary according to the position in a protrusion. Thus, the surface pressure at the protrusions is often variable. The variation in the surface pressure results in degradation of power generation characteristics, and is a problem to be solved.

SUMMARY OF THE INVENTION

Therefore, an object of the present invention is to provide a fuel cell and a separator therefor, in which the surface pressure of the protrusions can be as uniform as possible, and the internal resistance of the cell can be reduced, so that the power generation characteristics can be improved.

The present invention provides a fuel cell comprising: an membrane electrode assembly formed by holding an electrolyte membrane between a pair of electrodes; and a separator layered on both sides of the membrane electrode assembly for forming gas passages between the separator and the electrode. The separator includes protrusions formed on both surfaces thereof for contacting with the electrode, and a spacer portion disposed between the protrusions for substantially forming the gas passage. The protrusions and the spacer portions are arranged along the surface direction of the separator so as to form a corrugated plate. At least two drawn portions in which the thickness of the spacer portion changes to a thin portion are formed between the protrusions in the spacer portion.

According to the invention, when plural fuel cells are layered to form a fuel cell stack, the protrusions of the separator are press contacted with the electrode of the membrane electrode assembly. In this condition, the spacer portion is bent at two drawn portions as an inflection point following the assembling pressure. As a result, the spacer portion functions as a buffer like a plate spring, and the surface pressure in the protrusion with respect to the electrode is dispersed to be uniform. That is, in the portion in which the surface pressure is large, the bending angle of the spacer portion is large. In contrast, the portion, in which the surface pressure is large, is gently bent. Therefore, the surface pressure in the protrusions press contacted with the electrode is finally uniform. As a result, the contact resistance between the electrode plate and the separator is reduced, and the internal resistance of the cell is reduced and the power generating efficiency is improved.

The drawn portion is preferably bent so as to make the surface pressure uniform in the protrusion with respect to the electrode following the assembling pressure. In order to ensure the function, the ratio b/a (drawing ratio) is preferably in a range of 0.5 to 0.95 when "a" is defined as the thickness of the drawn portion and "b" is defined as the thickest portion of the spacer portion. When the drawing ratio is less than 0.5, the drawn portion is too thin and the strength thereof is insufficient, so that damage such as fractures and breaks in the drawn portion occur. In contrast, when the drawing ratio is more than 0.95, the strength of the drawn portion is too large, so that a function as a buffer may not be obtained. The separator in the fuel cell of the invention is preferably made from metals, since the material can yield suitable functions for the buffer. That is, the thickness of the drawn portion 13b is suitable, whereby the function of the buffer to make the surface pressure uniform can be sufficiently obtained.

The invention provides a separator layered on both sides of an membrane electrode assembly for forming gas passages between the separator and an electrode forming the membrane electrode assembly; wherein the separator includes protrusions formed on both surfaces thereof for contacting with the electrode, and a spacer portion disposed between the protrusions for substantially forming the gas passage, the protrusions and the spacer portions are arranged along a surface direction of the separator so as to form a corrugated plate, at least two drawn portions in which the thickness of the spacer portion changes to a thin portion are formed between the protrusions in the spacer portion, and the drawn portion.

The functions and advantages of the separator according to the invention are the same as the separator in the above fuel cell. Similarly to the above separator, the ratio b/a is preferably in a range of 0.5 to 0.95 when "a" is defined as the thickness of the drawn portion and "b" is defined as the thickest portion of the spacer portion, and the separator is preferably made from a metal.

DETAILED DESCRIPTION OF THE INVENTION

An embodiment of the invention will be explained hereinafter with reference to the figures.

Figure 1:
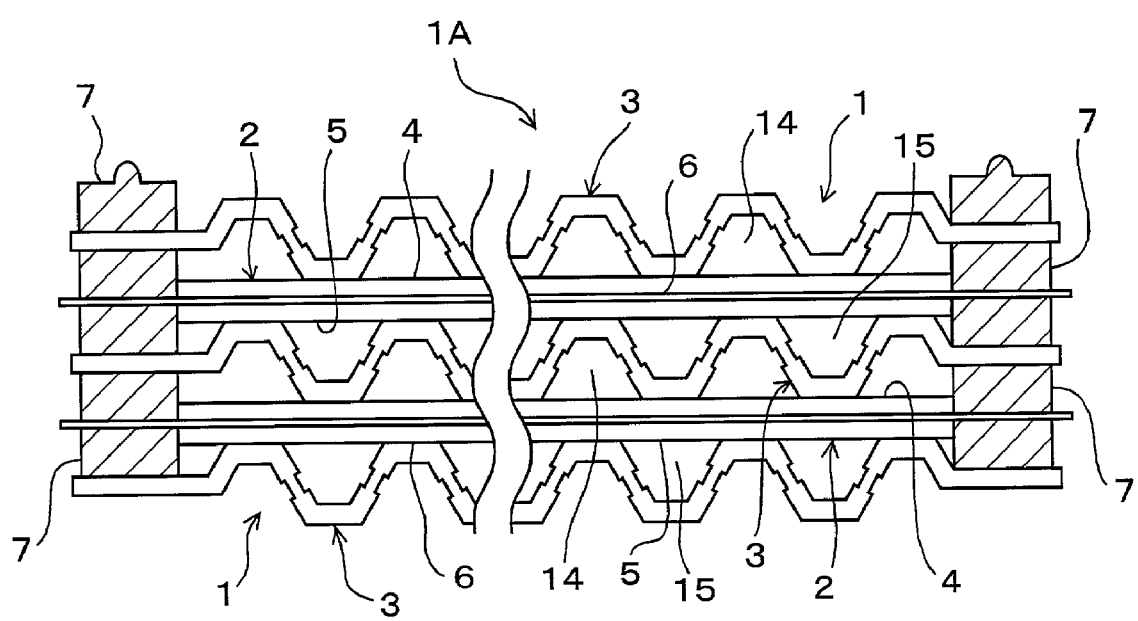
FIG. 1 is a schematic vertical cross section of a layered structure of a fuel cell stack according to an embodiment of the invention.

FIG. 1 is schematic view showing a layered structure of a fuel cell stack 1A. In the fuel cell stack 1A, a unit of a fuel cell 1 is formed by a plate-shaped cell unit 2 and separators 3 disposed on both sides of the cell unit 2, and plural units of the fuel cell 1 are layered with each other to form a multi-layered structure. The multi-layered structure is clamped by end plates (not shown) at a predetermined assembled pressure so as to maintain the multi-layered condition.

The cell unit 2 is a three-layered structure in which a electrolyte membrane 6 is held by a pair of gas diffusion electrode plates (positive electrode plate 4 and negative electrode plate 5), and is activated for use at a temperature of 80° C. or more. The electrolyte membrane 6 is made from, for example, fluorine-type membranes with a sulfonic acid group at a side-chain thereof such as Nafion (trade name, produced by DuPont) and Flemion (trade name, produced by Asahi Glass Co., Ltd.) The electrolyte membrane 6 at the center of the cell unit 2 has a larger area than the positive electrode plate 4 and the negative electrode plate 5 which have the same size, and the circumference of the electrolyte membrane 6 with a uniform width is exposed. A frame-shaped seal 7 made from rubber or resin is attached between the circumference of the electrolyte membrane 6 and the separator 3 so as to surround the positive electrode plate 4 and the negative electrode plate 5.

Figure 2:
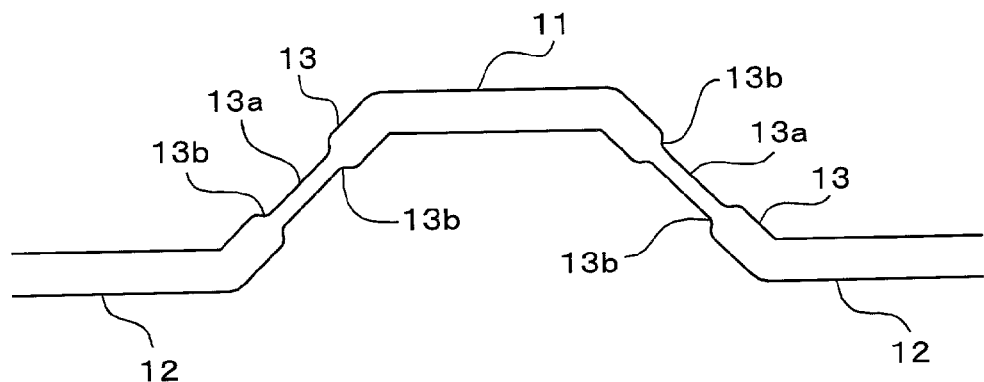
FIG. 2 is a partially enlarged cross section of a separator according to the embodiment of the invention.

The separator 3 is formed by press forming a metallic thin plate into a corrugated form in which trapezoidal bumps and valleys in cross section continue in the surface direction. More specifically, as shown in FIG. 2, a positive electrode contacting protrusion 11 for contacting the positive electrode plate 4 is formed on a surface of the separator 3, and a negative electrode contacting protrusion 12 for contacting the negative electrode plate 5 is formed on another surface of the separator 3. A spacer portion 13 having a slanted surface for substantially forming a gas passage is formed between the protrusions 11 and 12. The gas passage is an air passage 14 facing to the positive electrode plate 4 or a fuel gas passage 15 facing to the negative electrode plate 5. Air including an active material for the positive electrode flows in the air passage 14, and a fuel gas including active material for the negative electrode flows in the fuel gas passage 15. The separator 3 can be made by press forming a thin plate having suitable elasticity made from materials such as aluminum alloy, carbon steel, or stainless steel.

As shown in FIG. 2, the spacer portion 13 in the separator 3, which does not contact with the positive electrode plate 4 and the negative electrode plate 5, has an intermediate portion of which the thickness is smaller than that of the other portion (substantially the thickness of the separator 3). The portion where the intermediate thin portion 13a is connected to the thick portion at both sides thereof is round, that is, the both ends of the thin portion are drawn portions 13b. In order to form the thin portion 13a, for example, the intermediate portion is expanded when the separator 3 is press formed by adjusting the pressure or the speed in the press forming. Alternately, a press die having a protrusion for forming the thin portion 13a may be used, and the thin portion 13a is formed by the protrusion at the same time when the separator 3 is press formed. In another embodiment of the invention, the thin portion 13a may be machined after press forming, and in addition, the thin portion 13a may be formed by re-press forming the separator 3 after press forming thereof. Among these methods, the first or second method may be more preferable in view of production efficiency.

The thickness of the thin portion 13a and the drawn portion 13b are substantially the same. When the thickness is defined as "b" and the thickness of the thick portion except for the drawn portion 13b is defined as "a", the ratio b/a (drawing ratio) is set in a range of 0.5 to 0.95. For example, when the thickness "a" of the separator 3 is 0.2 mm, the thickness of the thin portion 13a and the drawn portion 13b is set in a range of 0.1 to 0.19 mm.

According to the embodiment, when plural units of the fuel cell 1 are arranged to form a fuel cell stack 1A, and the positive electrode contacting protrusion 11 is press contacted with the positive electrode plate 4, the negative electrode contacting protrusion 12 is press contacted with the negative electrode plate 5. In this condition, the spacer portion 13 is bent at two drawn portions 13b as an inflection point following the assembling pressure. As a result, the spacer portion 13 functions as a buffer like a plate spring, and the surface pressure in each protrusion 11 or 12 with respect to the positive electrode 4 and the negative electrode 5 is dispersed to be uniform. That is, in the portion in which the surface pressure is large, the bending angle of the spacer portion 13 is large. In contrast, the portion, in which the surface pressure is large, is gently bent. Therefore, the surface pressure in each protrusion 11 or 12 press contacted with the positive electrode 4 and the negative electrode 5 is finally uniform. As a result, the contact resistances between the positive electrode plate, the negative electrode plate 5 and the separator 3 are reduced, and the internal resistance of the cell is reduced and the power generating efficiency is improved.

Furthermore, since the drawing ratio b/a in the drawn portion 13b is set in a range of 0.5 to 0.95, damage such as fractures and breaks in the drawn portion 13b, which occur because the drawn portion 13b is too thin and the strength thereof is insufficient, can be prevented, and problems, in which the function for the buffer may not be obtained because the strength of the drawn portion 13b is too large are also avoided. That is, the thickness of the drawn portion 13b is suitable, whereby the function of the buffer to make the surface pressure uniform can be sufficiently obtained.

Figure 3:
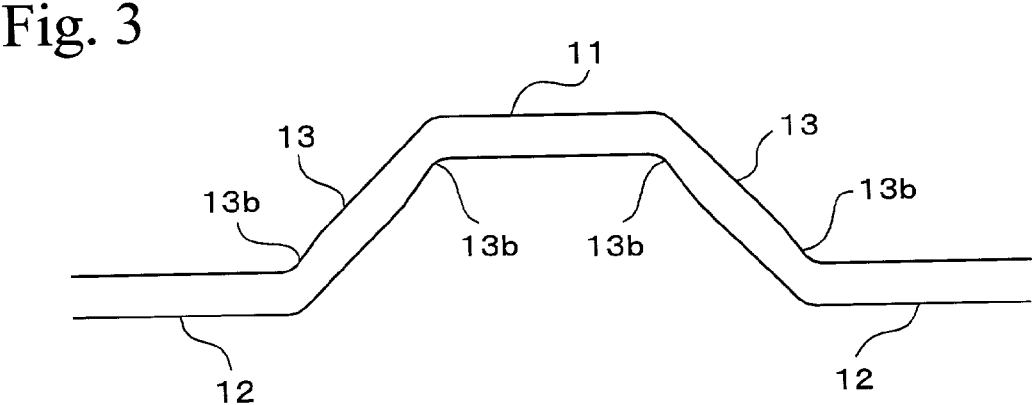
FIG. 3 is a partially enlarged cross section of an arrangement of the separator according to the embodiment of the invention.

FIG. 3 is an arrangement of the separator 3 which has a different shape of the drawn portion 13b. The drawn portion 13b is formed by making both ends of the spacer portion 13 partially thin. According to the drawn portions 13b, when plural fuel cells are layered and predetermined assembling pressure is provided thereto, the spacer portion 13 is bent at two drawn portion 13b as an inflection point, whereby the assembling pressure is cushioned. Therefore, the surface pressures in the positive electrode contacting protrusion 11 and the negative electrode contacting protrusion 12 press contacted with the positive electrode 4 and the negative electrode 5 are uniform.

EXAMPLE

Next, the advantages of the invention will be proved with reference to examples of the invention.

Sheets made from stainless steel (SUS 430) having thicknesses of 0.1 mm, 0.15 mm, 0.2 mm, 0.3 mm were press formed to separators (Samples Nos. 1 to 30) having the shape shown in FIG. 3 were produced. The drawing ratios in the drawn portions are shown in Table 1. The maximum thickness "a" of the protrusion, the minimum thickness "b" of the drawn portion, the depth of the gas passage, and the pitch of the gas passages are shown together in Table 1.

Figure 4:
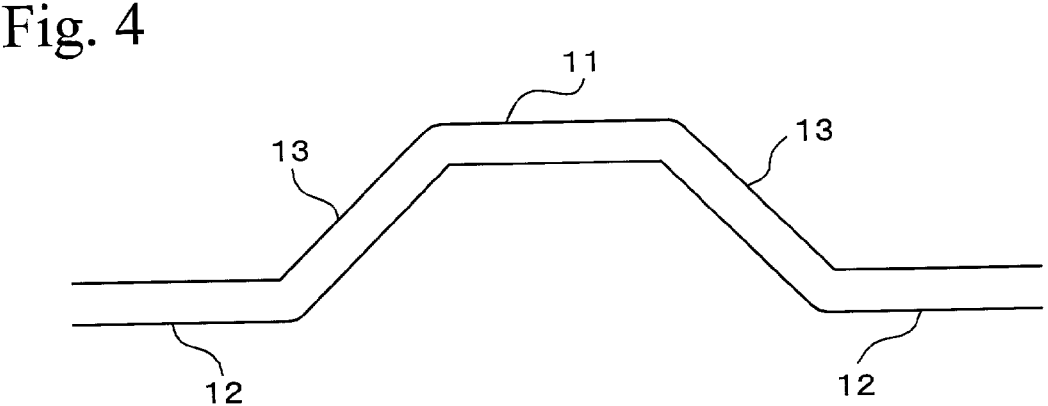
FIG. 4 is a partially enlarged cross section of a comparative example.
Figure 5:
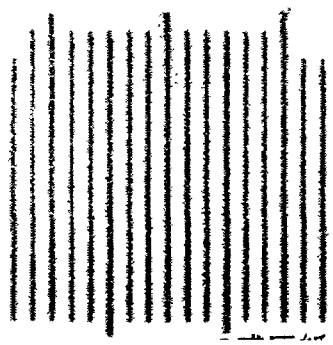
FIG. 5 shows a condition of surface pressure in a separator of the example of the invention.
Figure 6:
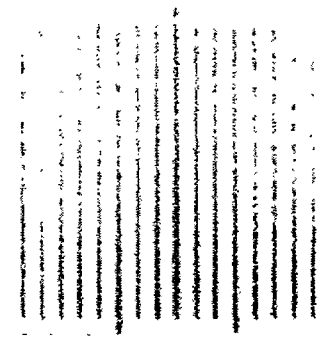
FIG. 6 shows a condition of surface pressure in a separator of the comparative example.

The separator of No. 15 of the invention and the separator of No. 1 which did not have a drawn portion such as the invention and the thickness thereof was uniform (drawing ratio of 100%, shown in FIG. 4) were picked up, and the protrusions on one surface thereof were press contacted with a pressure sensitive paper at a surface pressure of 5 kg/cm$^2$. The condition in which the protrusions were press contacted with the pressure sensitive paper was observed. FIG. 5 shows the condition of press contacting in the protrusion of the separator of No. 15, and FIG. 6 shows the condition of press contacting in the protrusion of the separator of No. 1. As is clear from the figures, the protrusions of the separator of No. 15 press contact with the pressure sensitive paper in overall length thereof and in uniform surface pressure. In contrast, in the separator of No. 1, portions in which the protrusion did not press contact with the pressure sensitive paper due to insufficient pressure dispersed, and uniform surface pressure was not obtained.

Figure 7:
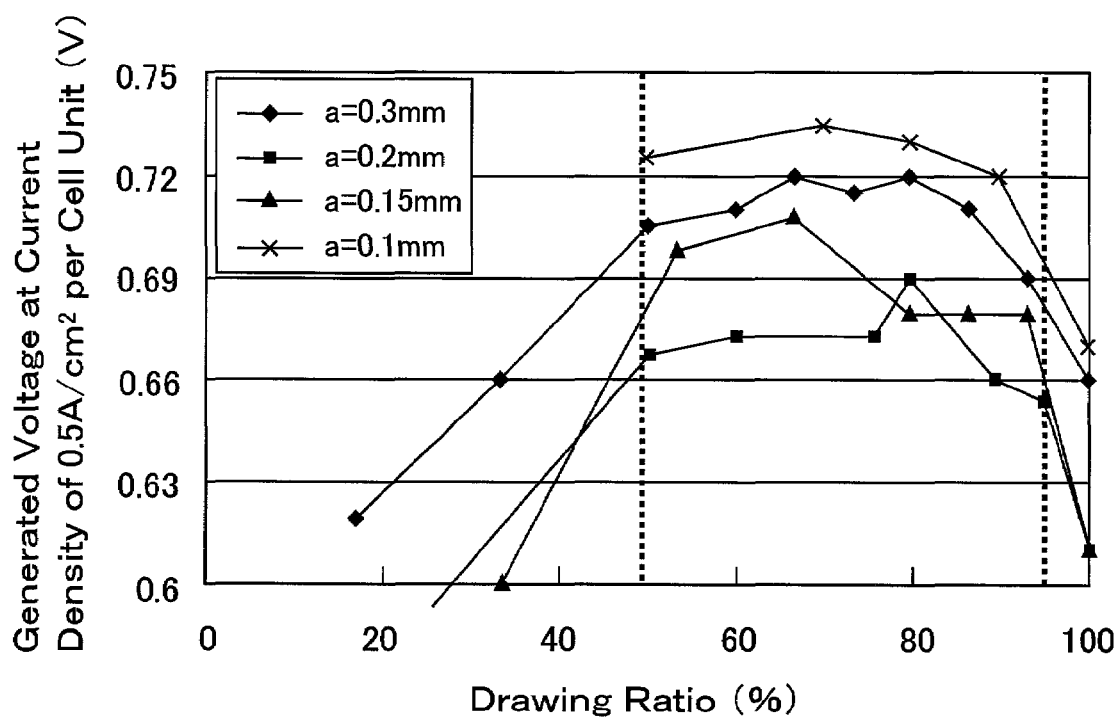
FIG. 7 is a diagram showing the results of research on the relationship between generated power voltage and drawing ratio in every thick ness of separators.

Next, thirty kinds of fuel cells shown in FIG. 1 were assembled using the separators of Nos. 1 to 30, and generated voltages at a current density of 0.5 A/cm$^2$ per cell unit were measured. The results are shown in Table 1 together. The relationship between the generated voltage and the drawing ratio in each thickness of the separator is shown in FIG. 7. As is clearly demonstrated by the results, in the cases in which the separators with the drawing ratios in the drawn portions are in the range of 50 to 95%, the generated voltages are greater than that of the separators in which the drawing ratios deviated from that range. The reason may be assumed to be that the surface pressure of the protrusion press contacted with the electrode is uniform and the internal resistance of cell is reduced due to decrease of the contact resistance. The reason why the generated voltages were small in the cases in which separators (Nos. 9, 10, 18) with small drawing ratio were used may be assumed to be that the thickness of the drawn portion was too thin and that that portion could not bear the load in the layered condition, so that fractures or breaks occurred.

TABLE 1

| No. | Maximum Thickness of Protrusion (mm) | Minimum Thickness of Drawn Portion (mm) | Depth of Gas Passage (mm) | Pitch of Gas Passages (mm) | Drawing Ratio (%) | Generated Voltage at Current Density of 0.5 A/cm$^2$ (V) |
|---|---|---|---|---|---|---|
| 1 | 0.3 | 0.3 | 0.8 | 3 | 100 | 0.66 |
| 2 | 0.3 | 0.28 | 0.8 | 3 | 93.3333 | 0.69 |
| 3 | 0.3 | 0.26 | 0.8 | 3 | 86.6667 | 0.71 |
| 4 | 0.3 | 0.24 | 0.8 | 3 | 80 | 0.72 |
| 5 | 0.3 | 0.22 | 0.8 | 3 | 73.3333 | 0.715 |
| 6 | 0.3 | 0.2 | 0.8 | 3 | 66.6667 | 0.72 |
| 7 | 0.3 | 0.18 | 0.8 | 3 | 60 | 0.71 |
| 8 | 0.3 | 0.15 | 0.8 | 3 | 50 | 0.705 |
| 9 | 0.3 | 0.1 | 0.8 | 3 | 33.3333 | 0.66 |
| 10 | 0.3 | 0.05 | 0.8 | 3 | 16.6667 | 0.62 |
| 11 | 0.2 | 0.2 | 0.6 | 3 | 100 | 0.608 |
| 12 | 0.2 | 0.19 | 0.6 | 3 | 95 | 0.6555 |
| 13 | 0.2 | 0.18 | 0.6 | 3 | 90 | 0.66025 |
| 14 | 0.2 | 0.16 | 0.6 | 3 | 80 | 0.68875 |
| 15 | 0.2 | 0.15 | 0.6 | 3 | 75 | 0.6745 |
| 16 | 0.2 | 0.12 | 0.6 | 3 | 60 | 0.6745 |
| 17 | 0.2 | 0.1 | 0.6 | 3 | 50 | 0.66975 |
| 18 | 0.2 | 0.05 | 0.6 | 3 | 25 | 0.59 |
| 19 | 0.15 | 0.15 | 0.6 | 3 | 100 | 0.6111 |
| 20 | 0.15 | 0.14 | 0.6 | 3 | 93.3333 | 0.679 |
| 21 | 0.15 | 0.13 | 0.6 | 3 | 86.6667 | 0.679 |
| 22 | 0.15 | 0.12 | 0.6 | 3 | 80 | 0.68 |
| 23 | 0.15 | 0.1 | 0.6 | 3 | 66.6667 | 0.7081 |
| 24 | 0.15 | 0.08 | 0.6 | 3 | 53.3333 | 0.6984 |
| 25 | 0.15 | 0.05 | 0.6 | 3 | 33.3333 | 0.6 |
| 26 | 0.1 | 0.1 | 0.6 | 3 | 100 | 0.67 |
| 27 | 0.1 | 0.09 | 0.6 | 3 | 90 | 0.72 |
| 28 | 0.1 | 0.08 | 0.6 | 3 | 80 | 0.73 |
| 29 | 0.1 | 0.07 | 0.6 | 3 | 70 | 0.735 |
| 30 | 0.1 | 0.05 | 0.6 | 3 | 50 | 0.725 |

What is claimed is:

1. A fuel cell comprising:
a membrane electrode assembly formed by holding an electrolyte membrane between a pair of electrodes; and
a separator layered on both sides of the membrane electrode assembly for forming gas passages between the separator and the electrode;
wherein the separator is formed by a solid sheet material, and includes:
a first protrusion projecting to the electrode and contacting therewith;
a second protrusion projecting counter to the electrode;
a spacer portion connecting the first and second protrusions for forming the gas passages;
wherein, the protrusions and the spacer portions are arranged along a surface direction of the separator so as to form a corrugated plate,
a drawn portion in which thickness of the spacer portion changes to a thin portion is formed at both ends of the spacer portion over entire area to which the gas passage extends.

2. A fuel cell according to claim 1, wherein ratio b/a is in a range of 0.5 to 0.95 when "a" is defined as thickness of the drawn portion and "b" is defined as the thickest portion of the spacer portion.

3. A fuel cell according to claim 1, wherein the separator is made from a metal.

4. A separator layered on both sides of a membrane electrode assembly for forming gas passages between the separator and an electrode forming the membrane electrode assembly;
wherein the separator is formed by a solid sheet material, and includes:
a first protrusion projecting to the electrode and contacting therewith;
a second protrusion projecting counter to the electrode;
a spacer portion connecting the first and second protrusions for forming the gas passage;
wherein, the protrusions and the spacer portions are arranged along a surface direction of the separator so as to form a corrugated plate,
a drawn portion in which thickness of the spacer portion changes to a thin portion is formed at both ends of the spacer portion over entire area to which the gas passage extends.

5. A separator according to claim 4, wherein ratio b/a is in a range of 0.5 to 0.95 when "a" is defined as thickness of the drawn portion and "b" is defined as the thickest portion of the spacer portion.

6. A separator according to claim 4, wherein the separator is made from a metal.

* * * * *